(12) United States Patent
Baird et al.

(10) Patent No.: US 6,651,807 B2
(45) Date of Patent: Nov. 25, 2003

(54) PARTS FEEDER

(75) Inventors: Randy K. Baird, Bolivar, PA (US); Leonard Evansic, Graceton, PA (US)

(73) Assignee: FMC Technologies, Inc., Chicago, IL (US)

( * ) Notice: Subject to any disclaimer, the term of this patent is extended or adjusted under 35 U.S.C. 154(b) by 14 days.

(21) Appl. No.: 10/025,067

(22) Filed: Dec. 18, 2001

(65) Prior Publication Data

US 2003/0111323 A1 Jun. 19, 2003

(51) Int. Cl.7 .............................................. B65G 27/02
(52) U.S. Cl. ........................................ 198/757; 198/769
(58) Field of Search ................................ 198/757, 769; 310/15, 21, 29

(56) References Cited

U.S. PATENT DOCUMENTS

| | | | | |
|---|---|---|---|---|
| 3,258,111 A | * | 6/1966 | Spurlin et al. | 198/220 |
| 4,007,825 A | * | 2/1977 | Spurlin et al. | 198/770 |
| 4,354,618 A | * | 10/1982 | Weyandt | 221/186 |
| 4,371,800 A | * | 2/1983 | Brander | 310/15 |
| 4,378,064 A | * | 3/1983 | Brown | 198/769 |
| 4,719,376 A | * | 1/1988 | Dean et al. | 310/29 |
| 4,921,090 A | * | 5/1990 | Gregor | 198/761 |
| 5,074,404 A | * | 12/1991 | Gonda et al. | 198/757 |
| 5,287,027 A | * | 2/1994 | Marshall et al. | 310/21 |
| 5,293,987 A | * | 3/1994 | Marshall et al. | 198/769 |
| 5,406,152 A | * | 4/1995 | Fechner et al. | 310/15 |
| 5,518,108 A | * | 5/1996 | Spurlin | 198/769 |
| 6,059,096 A | * | 5/2000 | Gladieux | 198/836.3 |
| 6,105,753 A | * | 8/2000 | Graham | 198/763 |
| 6,161,679 A | * | 12/2000 | Graham | 198/763 |
| 6,206,180 B1 | * | 3/2001 | Sekine et al. | 198/757 |

* cited by examiner

*Primary Examiner*—Christopher P. Ellis
*Assistant Examiner*—Rashmi Sharma
(74) *Attorney, Agent, or Firm*—Wood, Phillips, Katz, Clark & Mortimer

(57) ABSTRACT

In a parts feeder driven by an electromagnet driver, the magnet core and the armature are rotationally misaligned either to adjust the lines of direct magnetic force between the electromagnet and the armature or, where the armature is magnetically charged, such that the magnetic force will exert both an attractive force between the magnet core and the armature and a relative torque between the magnet core and the armature which tends to align the poles of the armature and the magnetic core. A round baseplate design allows the unit to be simply enclosed for aesthetic or for potential air purging applications. Counterweights for tuning the parts feeder natural frequency can be bolted to the round baseplate, the counterweights having a ring segment shape to compactly fit on the round baseplate.

11 Claims, 5 Drawing Sheets

PARTS FEEDER

TECHNICAL FIELD OF THE INVENTION

The invention relates to a vibratory parts feeder utilizing an electromagnetic vibratory drive. Particularly, the invention relates to an improvement in the electromagnetic drive and an improvement in the base assembly which supports the electromagnet of the drive.

BACKGROUND OF THE INVENTION

A typical vibratory parts feeder is shown in U.S. Pat. No. 3,258,111. The feeder includes a base mass that is supported upon vibration isolators and a frame mass that is mounted above the base mass by four inclined leaf spring sets which enable rotational oscillatory movement of the frame mass in response to an exciter motor. The frame mass includes a bowl for receiving parts.

The exciter motor is of an electromagnetic type that includes a field core and a coil mounted on the base mass. An armature is mounted on the underside of the frame mass with an air gap between opposing facing of the field core legs and the armature. When an alternating current is supplied to the coil, the armature and frame mass are alternately drawn toward the coil and released, flexing the leaf spring sets. Thus, the frame mass oscillates rotationally about a central vertical axis at a predetermined frequency that is established by the frequency of the current supplied to the coil.

As described for example in U.S. Pat. No. 4,007,825, a helical track originates in the bottom of the bowl and extends upwardly along an inner periphery of the bowl wall to an exit station at the top of the bowl. Parts can be progressively fed from the lower portion of the bowl along the helical track to the exit station as a given feed rate by vibratory energy.

Many manufacturers in the industry operate the vibratory bowl units at their resonant frequency to minimize electrical power consumption and to achieve maximum vibratory stroke. The pitfall of this approach is that the bowls and drives are then sensitized to mass changes, caused by more or fewer parts contained in the bowl, which creates increases and decreases in the vibratory stroke corresponding to the mass changes. A known solution to this pitfall has been to design sophisticated, and somewhat expensive, controls which monitor the resonant frequency and amplitude of stroke, and using these parameters, to change the control output dynamically to maintain the desired amplitude of vibration. This also has been a relatively expensive solution.

SUMMARY OF THE INVENTION

The present invention provides an electromagnet and armature mounting configuration that allows for optimization of the electromagnetic flux field density created by the electromagnetic coil. The configuration of the mounting allows for enhanced power conversion from electromagnetic power to physical bowl movement in the vibratory direction desired. Because of this approach, heavier vibratory bowls can be excited with less required electrical energy than units currently available.

According to one aspect of the invention, the electromagnet and armature are intentionally misaligned across the magnetic gap. By mis-aligning the armature to the electromagnet across the magnetic gap, the direct lines of magnetic force can be adjusted to fine tune the driving force of the vibratory drive and the natural frequency of the drive to adjust vibratory amplitude. The common industry practice is to align the magnet core and armature faces, in a direct alignment, to capitalize on the straight line of force attraction between the magnet core and the armature.

According to another aspect of the invention, the magnet core and a magnetic armature are rotationally misaligned such that the magnetic force will exert both an attractive force between the magnet core and the armature and a relative torque between the magnet core and the armature tending to align the poles of the armature and the magnetic core. This torque is arranged to be additive to the rotary force caused by the deflection of the inclined springs caused by the attractive force between the magnet core and the armature.

The invention allows for the adjustability of magnet core and armature alignment to modify bowl vibration amplitude. The unit may be aligned directly or can be misaligned dependent on the application desired. By intentionally misaligning the magnet core and the armature, advantages can be achieved such as the use of a single magnet on larger drive units, the "drive unit" being the parts feeder less the bowl; the use of only three spring stacks on larger units where such units typically have four or more spring stacks; significantly decreased power consumption while maintaining vibrational power. In some cases, a reduction by a factor of five for similar performance can be achieved. The invention allows for simple control technology to maintain higher strokes, such as by using variable voltage with no amplitude feedback.

The invention allows a single drive unit to handle a wide range of bowl weights such that one drive unit can be adjusted to carry a range of bowl sizes. Significantly lower inventory and manufacturing costs can be achieved.

The achievement of maximum stroke and minimization of electrical power consumption are achieved by operating the unit, not at resonance, but at a point above or below resonance to allow for mass changes in the bowl load which will then not affect the amplitude of the vibratory stroke.

According to another aspect of the invention, amplitude adjustment can be controlled by adding counterweight to the drive unit versus changing the springs to tune the resonant frequency of the unit. The manufacturing time to tune a parts feeder is greatly reduced. The invention utilizes a round baseplate design which allows the unit to be simply enclosed for aesthetic or for potential air purging applications. The counterweights have a ring segment shape to compactly fit on the round baseplate. The desired mass 1 (base assembly and electromagnet) to mass 2 (bowl, frame and armature) ratio can be maintained by increasing the mass 1 using incremental weight counterweights bolted to a common baseplate design. Manufacturing economies of scale can thus be achieved. The invention allows for the manufacture of one size of base assembly to replace a product mix of five sizes.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
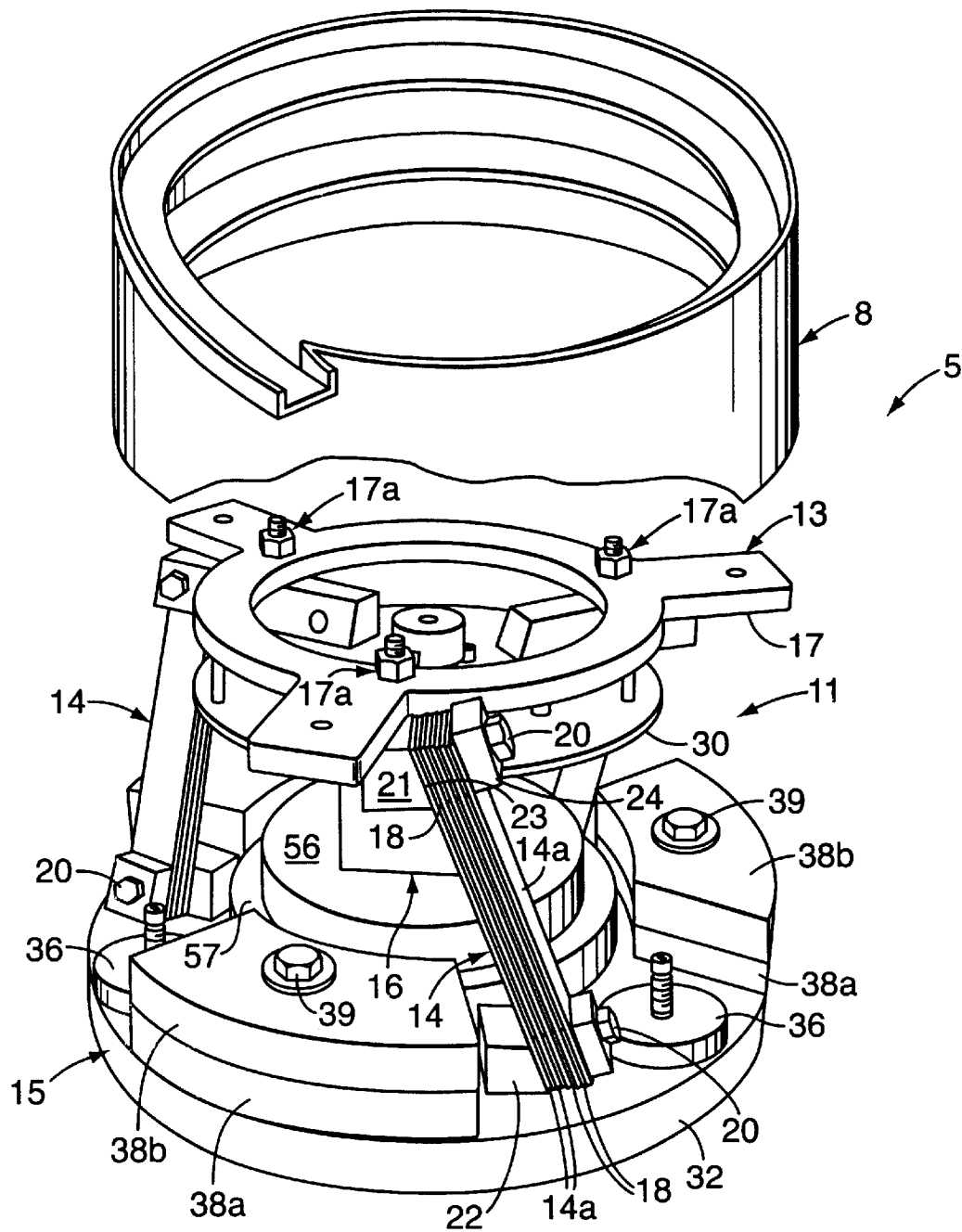
FIG. 1 is an exploded, fragmentary perspective view of a parts feeder according to the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a parts feeder 5 including a bowl 8 supported on a drive unit 11. The drive unit 11 is supported on isolators 12 (shown in FIG. 2). The drive unit 11 includes a frame 13 supported by three spring units 14 from a base assembly 15, and driven by a vibratory exciter 16. The frame 13 includes a bowl support 17 to which the bowl 8 is attached by fasteners (not shown). The base assembly 15 is preferably more massive by greater weight and rotational inertia than that of the frame so that the principal vibratory motion will be realized by the frame 13. The weight and rotational inertia characteristics of the feeder bowl 8 are additive to the weight and rotational inertia characteristics of the frame 13. The vibration of this two mass system, and the spring units 14 that couple the frame 13 and the base assembly 15, is powered by the vibratory exciter 16.

Everything attached to or carried by the frame 13 constitutes a certain mass, which coupled to the base assembly 15, results in a combined inertial mass which provides a natural frequency depending upon the tuning of the spring units 14.

The spring units 14 each include one or more leaf springs 14a, stacked and interleaved by spacers 18 at ends thereof, and held by bolts 20 and block washers 24 to upper and lower spring blocks 21 and 22. Each spring block 21, 22 has an inclined face or "spring seat" 23 on which the spring units are held by the bolt 20 and washer 24. The blocks 21, 22 are welded to a spring mounting plate 30 of the frame 13 and a baseplate 32 of the base assembly 15, respectively. The bowl support 17 is fastened to the upper spring blocks 21 by stud and nut assemblies 17a.

The baseplate 32 preferably has a round perimeter which allows for an effective cylindrical enclosure thereof, aesthetically pleasing and more compatible for air purging. A cylindrical shape has a greater pressure retaining capacity without distorting, given a selected wall thickness, than a cubical shape.

An isolator adjustment disk 36 and arcuate counterweights 38a, 38b are mounted around a perimeter of, and on, the baseplate 32, between each adjacent pair of spring blocks 22. The disks 36 are welded to the baseplate 32. Each pair of counterweights 38a, 38b is fastened to the baseplate 32 by a single bolt 39, penetrating a centralized hole of the counterweights and threaded into a threaded hole (not shown) of the baseplate 32.

The counterweights are selectively added to tune the natural frequency of the parts feeder. The counterweights are segments of a flat ring that has the outside diameter equal to the baseplate 32. The shape of the counterweights enhances a compact, overall design of the baseplate and minimizes floor space for the parts feeder. The counterweights serve to provide a cost effective, and time conserving, manufacturing method of tuning a parts feeder compared to the known method of adding, subtracting or changing leaf springs of the spring units.

Figure 1A:
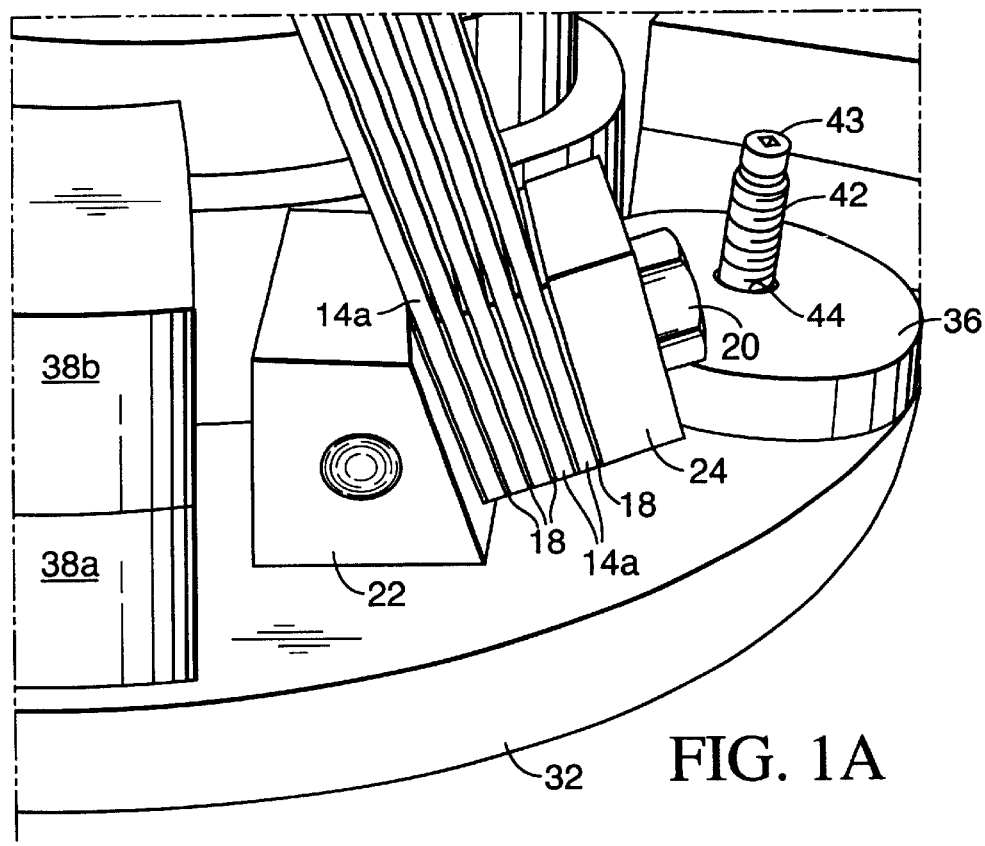
FIG. 1A is a fragmentary, enlarged perspective view of a portion of the parts feeder of FIG. 1.
Figure 2A:
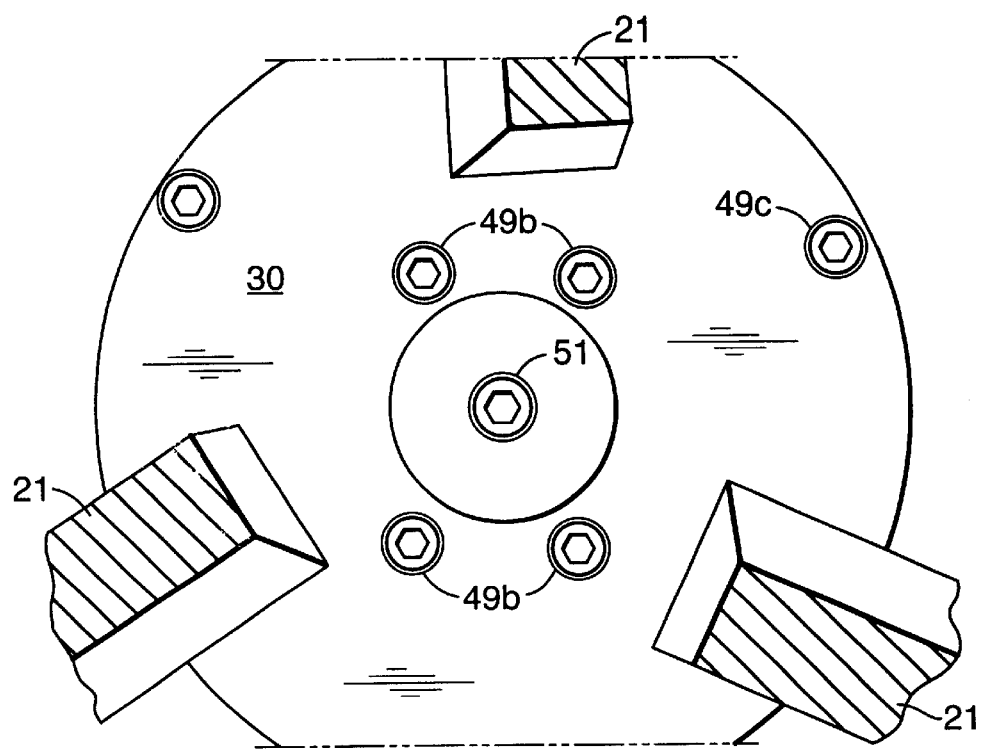
FIG. 2A is a fragmentary, sectional view taken generally along line 2A—2A of FIG. 2.
Figure 3:
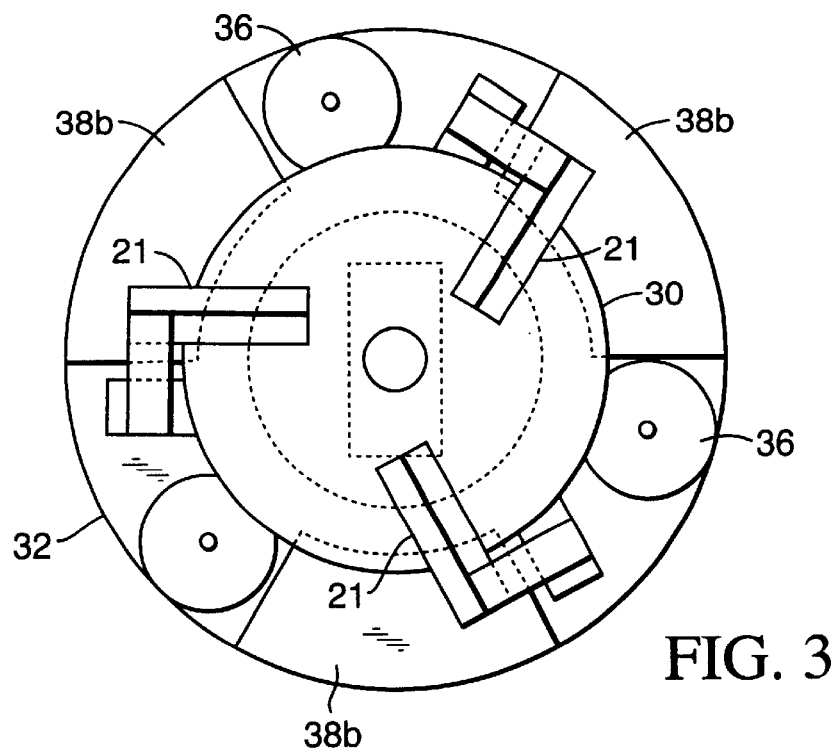
FIG. 3 is a diagrammatical, plan view of the parts feeder of FIG. 2.
Figure 2:
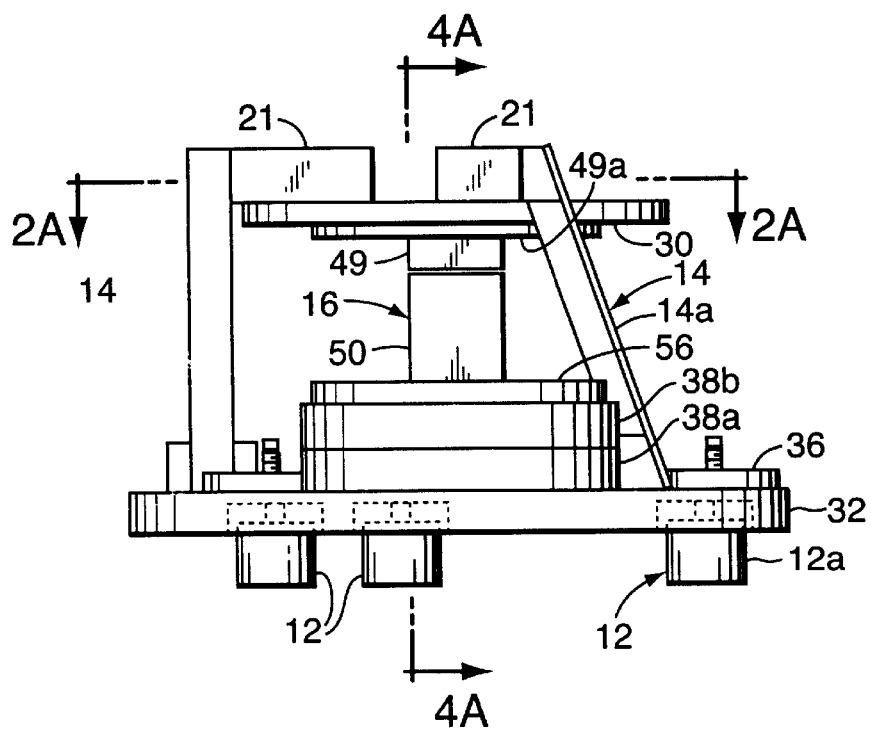
FIG. 2 is an diagrammatical, elevational view of the parts feeder of FIG. 1, shown with the bowl removed.

As illustrated in FIG. 1A, a threaded stud 42, having an Allen wrench or hex drive head 43, penetrates the disk 36, and is connected below the baseplate 32 to a foot 12a of the isolator 12 that is supported on the floor, as shown in FIG. 2. The stud 42 is threaded into a hole 44 through the disk 36. By advancing or retracting the threaded stud 42, by turning the head 43 with a tool, the elevation of the baseplate at each isolator can be adjusted. The invention thus allows convenient leveling adjustment from a top side of the baseplate.

Figure 4A:
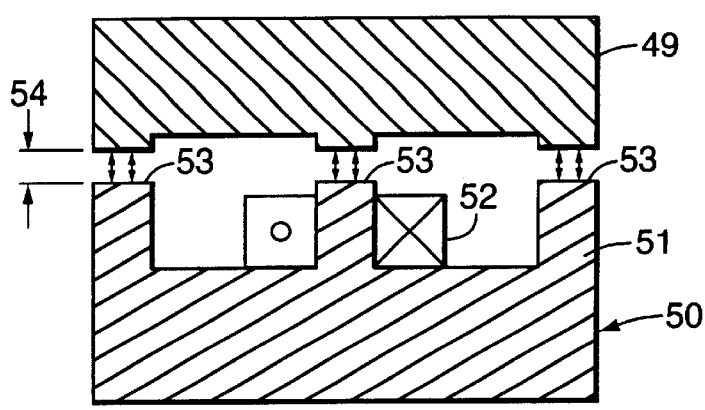
FIG. 4A is a schematic sectional view of the electromagnet and armature showing the lines of magnetic force therebetween.

Referring to FIGS. 2 and 4A, the vibratory exciter 16 includes an armature 49 and an electromagnet 50. The electromagnet 50 comprises a field core 51 having a prone E-shape, the central leg of which carries a coil winding 52. Three pole faces 53 of the E-shape provide a uniform air gap 54 between the pole faces 53 and an underside of the armature 49, the latter being secured to the underside of the spring mounting plate 30. The core 51 of the electromagnet is secured through a mounting block 56 and counterweights 57, as applicable, to the top of the baseplate 32.

For reasons explained below, one or both of the core 51 and the armature 49 can be fastened in a manner to be rotationally relatively adjustable about a vertical axis to set a degree of mis-alignment between the electromagnet pole faces 53 and the armature. The adjustability can be provided by set screws penetrating arcuate slots or oversized holes in the mounting block 56 and/or the armature 49, wherein the set screws can be loosened and the respective armature 49 or core 51 can be rotationally adjusted and the set screws re-tightened.

As illustrated in FIGS. 2 and 2A, preferably, the armature 49 is fixedly carried on an armature mounting plate 49a. The mounting plate 49a is attached to the overlying spring mounting plate 30 by a plurality of set screws 49b penetrating oversized holes in the spring mounting plate 30 and either threaded into the armature mounting plate 49a or into nuts located below the armature mounting plate 49a. The armature mounting plate 49a is rotationally guided on the support plate 30 at its center by a bolt or pin 51. To adjust the rotary position of the armature, the set screws 49b are loosened and a rotational fine adjustment screw 4c is selectively turned. The rotational fine adjustment screw 49c is located at a radial distance from the center of the mounting plate 49a and is threaded into a hole through the spring mounting plate 30. The adjustment screw 49c has a tapered end which abuts a side of an oversized tapered hole or other abutment of the armature mounting plate 49a such that advancement of the adjustment screw 49c into the spring mounting plate 30 progressively rotates the armature mounting plate 49a about the pin 51 with respect to the spring mounting plate 30. After rotational adjustment, the set screws 49b can be re-tightened. Alternately, or additionally, a similar rotary adjustment arrangement can be applied between the electromagnet mounting block 56 and the base plate 32, or the intervening counterweight 57 as applicable, wherein the electromagnet 50 is secured to the mounting block 56 and the mounting block is rotationally adjustable with respect to the base plate 32.

According to the common practice in the industry, the electromagnet 50 can be aligned vertically with the armature 49. The electromagnet is aligned pole face to pole face with all corners corresponding. This alignment allows for rotation motion of the bowl to be created as the electromagnetic coil is energized and de-energized. This direct alignment approach only captures the attraction power in the perpendicular direction of the electromagnetic pole face.

Figure 4B:
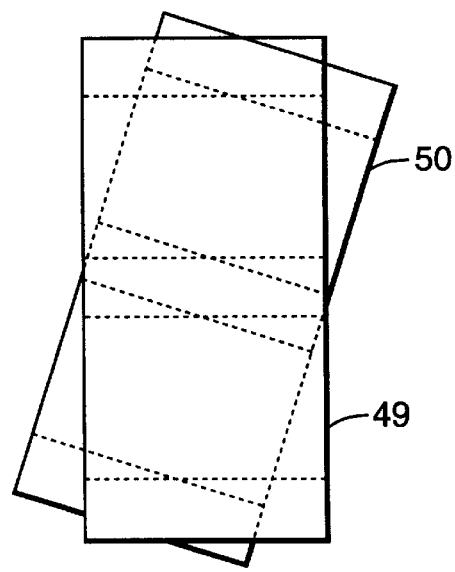
FIG. 4B illustrates a top view of the magnet and armature shown in FIG. 4A.

According to the invention, and as illustrated in FIG. 4B, the armature and electromagnet are intentionally, selectively misaligned to adjust the number of lines of direct magnetic force to adjust the vibratory drive force and the resultant parts feeder amplitude of vibration.

Figure 5:
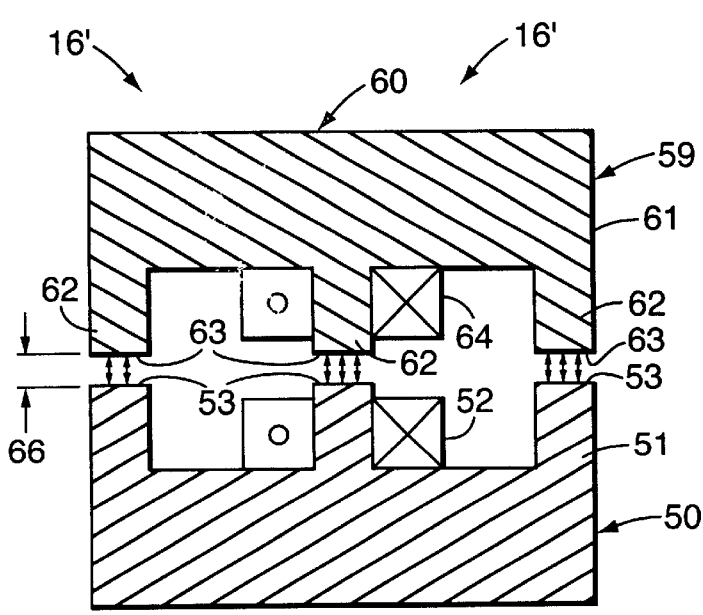
FIG. 5 is a diagrammatical, sectional view of an alternate embodiment electromagnet and armature arrangement.

FIG. 5 illustrates an alternate embodiment vibratory exciter 16' that includes the electromagnet 50 as previously described, and additionally includes an electromagnetic armature 60 that includes a prone, inverted E-shaped armature core 61 having poles 62 with pole faces 63 and a winding or coil 64 wound around the center one of the poles 62. The winding 64 is electrically charged at the vibrational frequency of the electromagnet 50 with an opposite voltage polarity, relative to the electromagnet 50, to attract the armature pole faces 63 periodically to the electromagnet pole faces 53. This arrangement increases the attractive force across the gap 66 and also increases the available torque T (FIG. 6) caused by the intentional misalignment between the armature 60 and electromagnet 50. As described above, the intentional misalignment can be selectively adjusted to tune the parts feeder, depending on the relative masses of the base assembly 15 and the frame 13 and feeder bowl 8, and the overall spring constants of the spring units 14.

Figure 6:
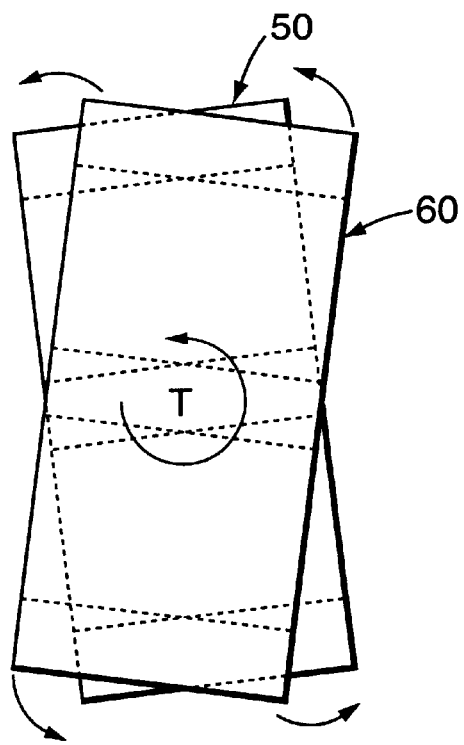
FIG. 6 is a diagrammatical plan view of the arrangement of FIG. 5.

The alignment illustrated in FIG. 6 not only capitalizes on the perpendicular lines of force but also on the non-perpendicular lines at the magnets end poles causing a torque T which urges the armature to align itself rotationally with the electromagnet. This approach energizes rotation not only due to spring deflections due to the direct alignment force, but also due to additional torque caused by the magnet and armature aligning themselves in the direction of vibratory rotation. This approach allows for better efficiency of transformation of the electrical energy driving the electromagnet to physical movement energy in the use of vibration to move products or parts in the feeder bowl.

Alternatively, rather than an armature having an electromagnetic winding, a permanent magnet armature can be used, having magnetic poles that correspond to the electromagnet pole faces, to periodically attract the armature to the electromagnet at the frequency of the charging of the electromagnet. As described above, the intentional misalignment of the electromagnet pole faces and the permanent magnet poles can be selectively adjusted to tune the parts feeder, depending on the relative masses of the base assembly 15 and the frame 13 and feeder bowl 8, and the overall spring constants of the spring units 14.

Figure 7:
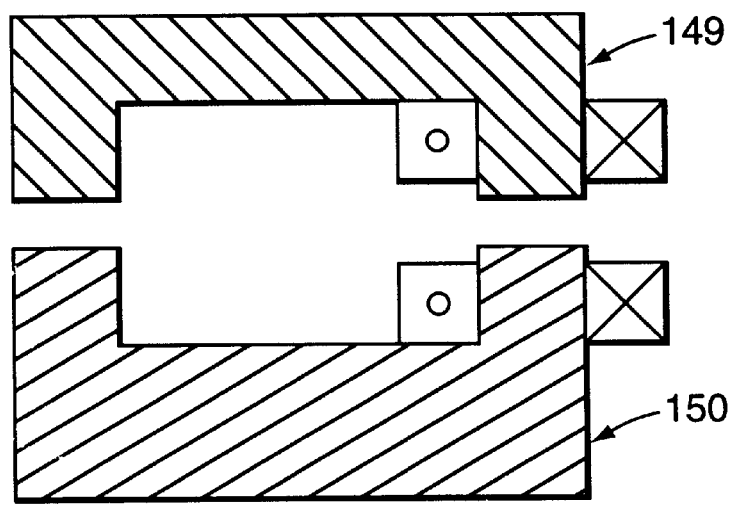
FIG. 7 is a schematic sectional view of an alternate arrangement electromagnet and armature.

FIG. 7 illustrates an alternate configuration electromagnet 150 and armature 149 configuration of the type shown in FIG. 5, utilizing U-shaped electromagnet and armature cores. The U-shaped cores can also be used with any of the previously described embodiments to replace respective E shaped cores.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A vibratory drive for a conveying apparatus, comprising:
    an electromagnet having at least two magnetic pole faces and having a length along a first direction between said magnetic pole faces;
    an armature, spaced closely to said magnetic pole faces, and having a length along a second direction between magnetic poles of said armature, said first direction and said second direction being skewed.

2. The vibratory drive according to claim 1, wherein said first direction and said second direction are relatively adjustable to adjust the degree that the first and second direction are skewed.

3. The vibratory drive according to claim 1, wherein said armature comprises an armature core having at least two pole faces closely spaced from said at least two pole faces of said electromagnet, and a winding around said armature core.

4. The vibratory drive according to claim 1, wherein said armature comprises a permanent magnet having poles arranged adjacent to respective pole faces of said electromagnet to be periodically attracted by said electromagnet.

5. A parts feeder, comprising:
    a baseplate;
    a plurality of vibration isolators arranged to support said baseplate from an external support;
    an electromagnet mounted on said baseplate and having a core with pole faces directed upwardly;
    a frame arranged above said baseplate;
    a parts-receiving-and-conveying bowl supported on said frame;
    a plurality of leaf springs each connected to said baseplate at one end and to said frame at an opposite end, said plurality of leaf springs arranged spaced-apart around a periphery of said baseplate, each leaf spring inclined in a common rotational direction around the baseplate; and
    an armature mounted to said frame and closely spaced from said pole faces, said armature having a preset rotational mis-alignment to said core.

6. The parts feeder according to claim 5, wherein said baseplate comprises a circular perimeter.

7. The parts feeder according to claim 5, comprising a plurality of counterweights, each counterweight having a shape of a segment of a ring, said counterweights attached to said baseplate.

8. The parts feeder according to claim 5, wherein said armature comprises an armature core having at least two armature pole faces, said at least two armature pole faces closely spaced from said pole faces of said electromagnet, and a winding surrounding said armature core.

9. The parts feeder according to claim 5, wherein said armature comprises a permanent magnet having poles arranged adjacent to respective pole faces of said electromagnet in order to be periodically attracted by said electromagnet.

10. The parts feeder according to claim 5, wherein said isolators comprise threaded height adjusters, said height adjusters including tool-engageable ends exposed on a top side of said baseplate.

11. The parts feeder according to claim 5, wherein said baseplate comprises a circular perimeter and a plurality of counterweights, each counterweight having a shape of a segment of a ring, said counterweights attached to said baseplate, the ring having an outside diameter equal to said circular perimeter.

* * * * *